(No Model.)
A. J. SHAW.
ELECTRO MAGNETIC BRAKE.
No. 461,052. Patented Oct. 13, 1891.
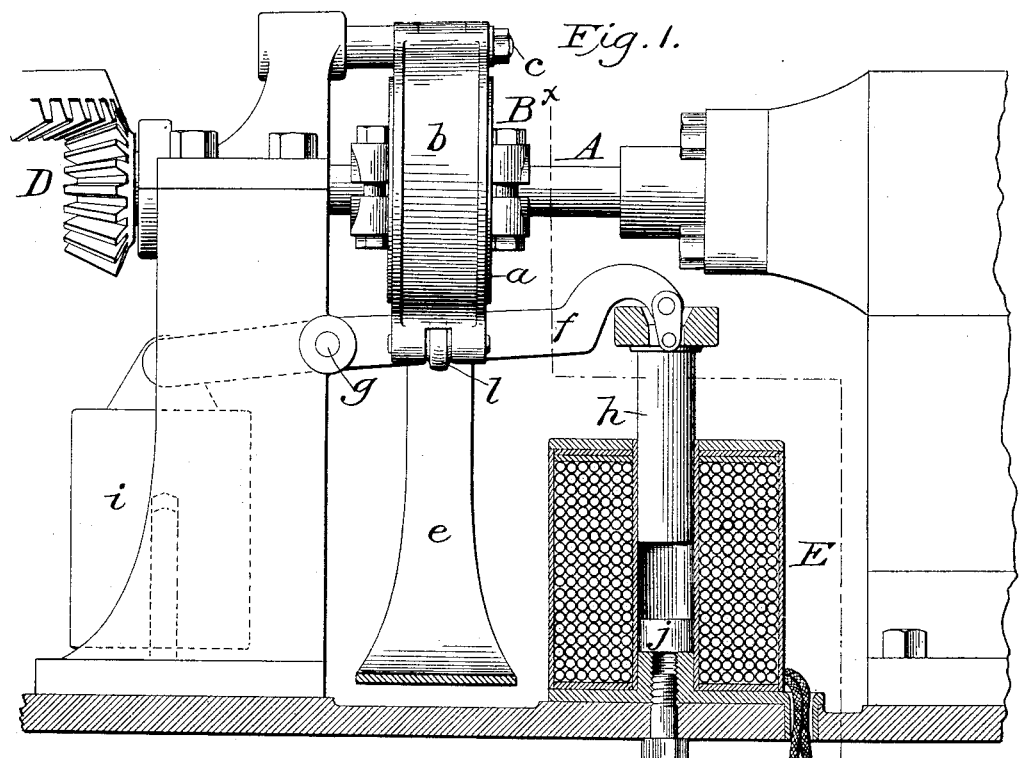
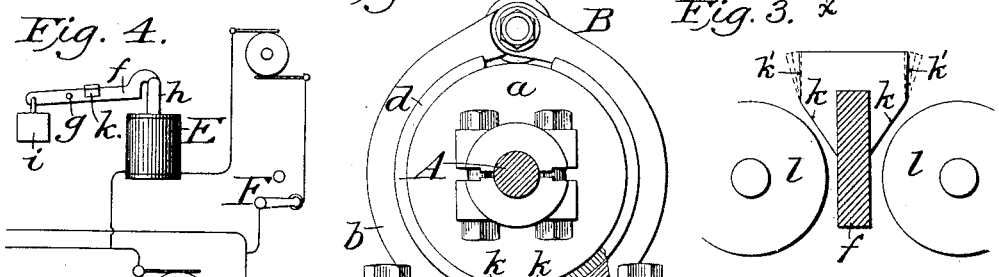
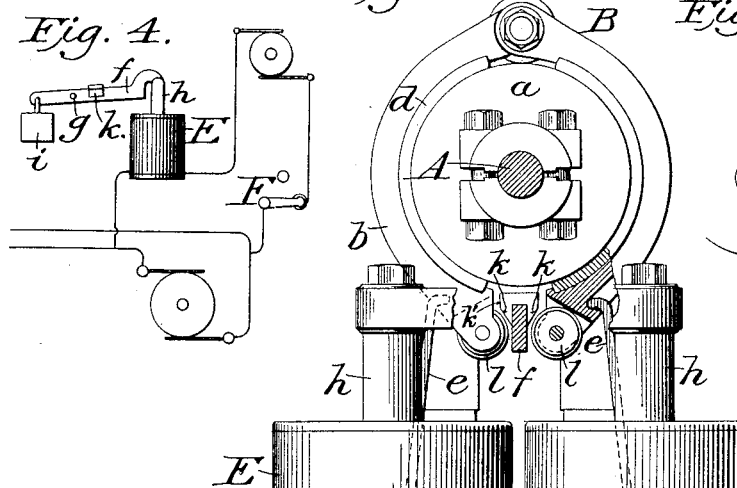
Witnesses:
James F. Duhamel
Horace A. Dodge
Inventor:
Alton J. Shaw,
by Dodge & Sons,
Attys.

UNITED STATES PATENT OFFICE.

ALTON J. SHAW, OF MILWAUKEE, WISCONSIN.

ELECTRO-MAGNETIC BRAKE.

SPECIFICATION forming part of Letters Patent No. 461,052, dated October 13, 1891.

Application filed July 2, 1891. Serial No. 398,244. (No model.)

*To all whom it may concern:*

Be it known that I, ALTON J. SHAW, a citizen of the United States, residing at Milwaukee, in the county of Milwaukee and State of Wisconsin, have invented certain new and useful Improvements in Electro-Magnetic Brakes, of which the following is a specification.

My invention relates to electric motors, and particularly to an automatic magnetic brake therefor designed to bring the motor or the machinery driven by said motor to a standstill immediately upon the interruption of the working current, the invention being in the nature of an improvement upon that described and claimed in Patent No. 452,619, issued to me under date May 19, 1891, the purpose of the present improvement being to overcome the intermittent or so-called "pumping" action of the brake.

In the accompanying drawings, Figure 1 is a side elevation of a motor provided with my improved brake, the magnet being shown in section; Fig. 2, a cross-section of the same on the line X X of Fig. 1; Fig. 3, an enlarged view of the wedge which serves to spread the brake-band and throw the same off when the motor is in action, and Fig. 4 a diagram illustrating the arrangement of the circuits.

The present invention, like that set forth in the application above referred to, is designed more particularly for use in connection with hoisting machinery in which the lowering of the load is attended with a racing of the motor and the consequent generation of a counter electro-motive force which tends to weaken the current and bring the parts to a standstill. When the current is thus weakened, or, as it is popularly termed, "drags," the power of the electro-magnet to hold the brake off or out of action is sensibly reduced, and unless the form of wedge employed to spread the brake-arms and hold them off the brake drum or disk be properly designed to prevent such a result the power of the springs used to apply the brake will be found sufficient to force the wedge from between said arms and cause the application of the brake while the current is still on. My invention is designed to overcome this difficulty; and it consists in a peculiar form of wedge hereinafter more fully set forth.

In order that the invention may be clearly understood, I have shown and shall describe so much of the attendant mechanism as is necessary to a proper explanation of the present improvement.

Referring now to said drawings, A indicates the spindle or arbor of the armature of an electric motor, B the magnetic or electrically-controlled brake, and D gearing designed to indicate hoisting apparatus of any kind or means for connecting the motor and brake apparatus with such mechanism. It will of course be understood that the representation of gearing is simply by way of illustration, and that gearing will not of necessity be employed, and that the motor may be connected in any convenient manner with whatever apparatus is to be operated thereby.

Owing to the exceedingly high velocity of the armature it is liable to continue in motion for some little time after the current by which the motor is supplied is broken, and such overrunning is in many cases a serious obstacle to the use of such machinery. To obviate this difficulty, I provide the magnetic brake B, the details of which are illustrated in Figs. 1, 2 and 3.

Secured upon the shaft or arbor A of the motor is a drum or disk *a*, and hung from a pivot-pin *c* above the drum or disk *a* are two semicircular arms or levers *b b*, which constitute the brake proper. The drum or disk *a* is made of any suitable material, as cast-iron or vulcanized fiber, and the arms *b b* are provided with shoes or linings *d* of material suited for use in connection with the material selected for the drum or disk *a*, these matters varying according to the uses to which the apparatus is to be applied or to the notions of the particular constructer. The lower ends of the two curved arms *b b* are pressed and held toward each other by a strong U-shaped spring *e*, the ends of which are seated in notches or recesses in the arms, as shown in the sectionalized portions of Fig. 2. When free to act, this spring serves to move the arms *b b* toward each other and to force the shoes or linings *d* promptly into contact with the periphery of the drum or disk *a*, and thereby to produce a degree of friction sufficient to prevent the rotation of the arbor or spindle A, and consequently sufficient to prevent the operation of the motor. The power of the spring will of course be proportionate to the dimensions of the co-operating parts and to the power of the motor, but should in any case be sufficient to promptly stop the rotation of the armature and bring the parts to rest instantaneously, or practically so.

To control the action of the brake B, I employ the solenoids E, the cores $h$ of which are suspended from the end of the lever $f$, pivoted at $g$ in the main frame of the apparatus, or in any other suitable support, the opposite end of the lever $f$ being counterbalanced by a weight $i$, as shown in Figs. 1 and 4. The descent of the cores $h$ is limited and the range of movement of lever $f$ is consequently determined by blocks $j$, of wood or other suitable material, placed within the central openings of the solenoid-coils. It is deemed advisable to guide the counter-balance $i$ in its movements, and for this purpose a guiding-stem is provided, as shown in dotted lines in Fig. 1. The lever $f$ extends between the lower ends of the arms $b$ of the brake B and is provided with beveled lugs or inclines $k\ k'$, which, when the cores $h$ are drawn into the solenoid-coils, descend, and passing between the lower ends of the arms $b$ and bearing against them or against anti-friction rollers $l$, mounted therein, force the arms apart against the pressure or resistance of spring $e$ and relieve the drum or disk $a$ of friction, thereby leaving the spindle A, and consequently the armature of the motor, free to turn. When the cores $h$ rise or move outward from the coils, the inclines $k\ k'$ ride off and clear of the rollers $l\ l$ and permit the arms $b$ to be thrown inward and to clasp and bind the hub $a$, as above explained.

The solenoid-coils are advisably included in the circuit in which the motor is placed; but they may be in a shunt or a circuit derived from the main circuit, though the former arrangement is preferred. This is illustrated in Fig. 4, in which the motor and the solenoid are represented as arranged in series in the main or working circuit which supplies the motor, said circuit being represented as a shunt or a derived circuit taken from the leading wire of the generator. This is a common arrangement of electric motors; but it is obvious that the leading wires of the generator may themselves be arranged to constitute the working circuit, if desired.

F indicates a switch or circuit-closer by which the working circuit of the motor may be completed or interrupted at will.

The description above given, with the exception of the reference to the inclines $k\ k'$, is that of the magnetic brake described in my aforesaid application; but the form of the incline or wedge-block is different in the present case from that of said application, and this difference constitutes the point of improvement in the present over the former invention. As shown in Fig. 3 the wedge consists of two double-inclined faces $k\ k'$, the faces $k$ being at a wide angle to each other, while the faces $k'$ are at a slight angle or more nearly approximating parallel planes. The reason for this change is as follows: When the motor is reversed for the purpose of lowering the load, the load itself tends to descend with such rapidity as to cause the "racing" of the armature, or, in other words, to cause the armature to rotate at a speed greater than would be given it by the operating-current alone. Whenever this occurs, there is a diminution of the effective current, attended, of course, by a weakening of the solenoids E, which, being designed to furnish only sufficient power to certainly withdraw the brake when operating with normal current, will be insufficient to hold the brake off against the powerful action of the spring $e$ upon the sharply-inclined faces $k$ of the wedge-block or inclined edges, the form given to the wedge-block under the previous construction. Under the present construction, however, the sharply-inclined faces $k\ k$ serve to promptly spread the arms $b\ b$ and throw off the brake; but when this is done the slightly-inclined faces $k'\ k'$ enter in between the rollers $l\ l$ or between the lower ends of the arms $b\ b$ and serve to keep said arms separated, but do not offer a sufficiently sharp inclination to enable the spring $e$ to force or crowd the wedge-block upward by pressure upon said faces, whereas under the former construction this action occurred whenever the current was materially reduced below the normal working point.

It is obvious that a single solenoid or that other form of electro-magnet may be employed, though I prefer two solenoids, as represented in the drawings.

It is manifest that a single arm $b$ and a wedge-block having simply one inclined face $k\ k'$ may be used or that the single or double inclined block may be used to throw off a brake of other form, the invention not being restricted in this respect to the precise details shown, but consisting, broadly, in the formation of the wedge with an incline having two different degrees of inclination, substantially as and for the purpose explained. So, too, a weight may be substituted for the spring, though the spring is deemed preferable, because of its greater quickness of action.

Having thus described my invention, what I claim is—

1. In combination with an electric motor and with a brake drum or disk, a brake-shoe or band adapted to bear upon said drum or disk and to prevent the rotation of the same, a pressure device serving to force and hold the brake shoe or band against the drum or disk, a lever provided with an inclined face of varying angle to work against and force back the shoe or release the band, an electro-magnet connected with the source of supply of said motor, and an armature carried by the lever and arranged within the field of attraction of the electro-magnet, substantially as and for the purpose set forth.

2. In combination with the shaft or arbor of an electromotor, a drum or disk $a$, secured thereon, pivoted shoes $b\ b$, adapted to bear against the drum or disk $a$ and to prevent the rotation of the same, a spring $e$, serving to force and hold said pivoted shoe against the drum or disk, a lever F, provided with varying inclines $k\ k'$ to work between and force apart said arms, the coil E, connected with the source of supply of said motor, and core $h$, carried by the lever and working within the coil, substantially as and for the purpose set forth.

In witness whereof I hereunto set my hand in the presence of two witnesses.

ALTON J. SHAW.

Witnesses:
CHAS. L. GOSS,
E. G. ASMUS.